(12) United States Patent
Coulter et al.

(10) Patent No.: US 7,828,434 B2
(45) Date of Patent: Nov. 9, 2010

(54) ZONE SWITCHED SPORTS TRAINING EYEWEAR

(75) Inventors: Ryan Coulter, Beaverton, OR (US); Michael Collier, Portland, OR (US); Phil Frank, Portland, OR (US); Alan W. Reichow, Forest Grove, OR (US); Karl M. Citek, Forest Grove, OR (US)

(73) Assignee: Nike, Inc., Beaverton, OR (US)

( * ) Notice: Subject to any disclaimer, the term of this patent is extended or adjusted under 35 U.S.C. 154(b) by 291 days.

(21) Appl. No.: 11/514,822

(22) Filed: Aug. 31, 2006

(65) Prior Publication Data

US 2008/0055541 A1   Mar. 6, 2008

(51) Int. Cl.
    *G02C 7/06* (2006.01)
(52) U.S. Cl. .................. 351/169; 351/159
(58) Field of Classification Search ......... 351/168–169, 351/171–172
    See application file for complete search history.

(56) References Cited

U.S. PATENT DOCUMENTS

| 3,555,563 | A | * | 1/1971 | Grossman ............... 2/433 |
| 3,972,319 | A | * | 8/1976 | Dehlinger .............. 600/27 |
| 3,972,589 | A | | 8/1976 | Skelly et al. |
| 3,999,180 | A | | 12/1976 | Hickman |
| 4,106,217 | A | | 8/1978 | Witt |
| 4,152,846 | A | | 5/1979 | Witt |
| 4,279,474 | A | | 7/1981 | Belgorod |
| 4,283,177 | A | | 8/1981 | Kron et al. |
| 4,300,818 | A | | 11/1981 | Schachar |
| 4,435,732 | A | | 3/1984 | Hyatt |
| 4,461,477 | A | | 7/1984 | Stewart |
| 4,471,385 | A | | 9/1984 | Hyatt |
| 4,482,326 | A | | 11/1984 | Witt |
| 4,688,900 | A | | 8/1987 | Doane et al. |
| 4,698,668 | A | | 10/1987 | Milgram |
| 4,781,440 | A | | 11/1988 | Toda |
| 4,848,890 | A | | 7/1989 | Horn |
| 4,873,572 | A | | 10/1989 | Miyazaki et al. |
| 4,907,860 | A | | 3/1990 | Noble |
| 4,985,762 | A | | 1/1991 | Smith |
| 5,026,151 | A | | 6/1991 | Waltuck et al. |
| 5,276,536 | A | | 1/1994 | Hokamura |

(Continued)

FOREIGN PATENT DOCUMENTS

JP   55069120 A  *  5/1980 ............... 351/44
JP   63149621 A     6/1988

OTHER PUBLICATIONS

Patent Cooperation Treaty Search Report mailed Oct. 6, 2008 for International Application No. PCT/US07/77406, 8 pages.

(Continued)

*Primary Examiner*—Joseph Martinez
*Assistant Examiner*—James R Greece
(74) *Attorney, Agent, or Firm*—Shook, Hardy & Bacon LLP (57) ABSTRACT

Vision training eyewear include lenses having a plurality of obscuration zones. The obscuration zones are individually switchable to provide light emission or attenuation that can interfere with normal vision of the wearer. A pattern or sequence of patterns can be selectively activated at a fixed or variable rate while a trainee is exposed to a test situation.

22 Claims, 9 Drawing Sheets

U.S. PATENT DOCUMENTS

| | | | |
|---|---|---|---|
| 5,372,504 A | 12/1994 | Buechler | |
| 5,452,026 A * | 9/1995 | Marcy, III | 351/45 |
| 5,478,239 A | 12/1995 | Fuerst et al. | |
| 5,608,567 A * | 3/1997 | Grupp | 359/275 |
| 5,671,055 A | 9/1997 | Whittlesey | |
| 5,841,507 A | 11/1998 | Barnes | |
| 6,097,450 A | 8/2000 | Humphrey | |
| 6,450,642 B1 * | 9/2002 | Jethmalani et al. | 351/219 |
| 6,493,154 B1 | 12/2002 | Humphrey | |
| 6,511,175 B2 * | 1/2003 | Hay et al. | 351/45 |
| 6,513,928 B1 * | 2/2003 | Moore | 351/118 |
| 6,619,799 B1 | 9/2003 | Blum et al. | |
| 6,942,336 B2 * | 9/2005 | Foulke et al. | 351/46 |
| 2005/0140922 A1 * | 6/2005 | Bekerman et al. | 351/41 |
| 2005/0146674 A1 | 7/2005 | Foulke | |

OTHER PUBLICATIONS

Supplementary European Search Report mailed Aug. 27, 2009 for International Application No. EP 07841732, 4 pages.

* cited by examiner

ZONE SWITCHED SPORTS TRAINING EYEWEAR

FIELD

The disclosure pertains to vision training, particularly for sports vision.

BACKGROUND

Athletic achievement in both individual and team sports continues to improve. Scientifically proven nutrition and training regimes are available to athletes at all levels from personal trainers, specialized coaches, and Internet-based trainers and training programs. In addition, athletic equipment, footwear, and apparel have been developed to offer athletes superior performance as well as a stylish appearance and comfort. Injury treatment has also improved, and some serious injuries that were previously career ending can be treated with techniques that permit nearly complete recovery with only a brief period of rehabilitation. Thus, athletes are fitter, stronger, better trained, better equipped, and better cared for than ever before.

While athletic performance is a direct function of an athlete's physical condition, many sports demand that the athlete accurately perceive and respond to the position and motion (such as velocity, acceleration, deceleration) of teammates, competitors, and sport-specific objects such as footballs, basketballs, baseballs, pucks, or other objects. For example, successful hitters in baseball or football quarterbacks appear to have higher visual acuity than others, at least with respect to situations encountered in their sports. In order to increase personal performance, athletes have become interested in vision training as another avenue toward enhanced performance. For example, hitters want to improve their vision so as to be able to see the seams on a 90+ mph fastball. Thus, athletes are targeting achieving superior visual dexterity to complement their physical dexterity. Unfortunately, available methods for vision training and assessment are generally not well tailored to the specific skills needed for a selected sport, nor are the methods readily configurable to provide the varied training that can be required. Accordingly, improved methods and apparatus are needed for vision training.

SUMMARY

Vision training eyewear and training methods are provided. Representative eyewear comprise at least a first lens defining a plurality of zones having selectable optical transmittance, and a frame configured to retain the first lens and to support the lens in front of a wearer's eye. One or more zone connection conductors are coupled to one or more zones of the first lens and adapted to provide control signals to the zones. In typical examples, the eyewear further comprise a second lens defining a plurality of zones and retained in the frame so as to position the first lens and the second lens in front of respective eyes of the wearer. Zone connection conductors are coupled to one or more zones of the first lens and the second lens. In other examples, a lens driver is secured to the frame and coupled to the first and second lenses so as to provide control signals to the zones of the first and second lenses. In some examples, the lenses comprise a flexible liquid crystal device on which the zones are defined, and the flexible liquid crystal device is secured to a lens substrate. The lens has an anterior surface and a posterior surface in an as worn position, and the anterior surface and the posterior surface have curvatures of at least four diopters.

In one particular example, one lens (or both lenses) comprises a low minus power noncorrective lens substrate to be mounted in front of the wearer's eye and tilted toward the face. The lens substrate has an optical axis that is angularly deviated in a direction substantially opposite the direction of tilt toward the face, at a sufficient angle away from parallel with a line of sight to substantially minimize prismatic distortion. (An optical axis of lens substrate is a line through centers of curvature of the anterior surface and the posterior surface of the lens substrate.)

In additional examples, the eyewear comprise a level selector configured to adjust a level of visual difficulty provided by one or both lenses. In some examples, the level of difficulty is associated with a duration during which a zone pattern is substantially light blocking. In further representative examples, a zone selector is configured to select a predetermined set of zones for reduced optical transmission.

In one example, eyewear comprise first and second lenses defining respective pluralities of zones and retained in a frame so as to position the first lens and the second lens in front of respective eyes of a wearer. At least one zone connection conductor is coupled to the zones of the first and second lenses, and is configured to receive a control signal so as to selectively vary an optical transmission of sets of zones. A lens driver can be secured to the eyewear (or provide separately) and configured to actuate a first set of zones on the first lens and a second set of zones of the second lens to alternately substantially transmit and substantially attenuate a light flux directed through the first lens and the second lens. The eyewear also includes a pattern selector configured to select the first set of zones and the second set of zones and a user input for selection of an interval during which the first set of zones and the second set of zones are substantially attenuating. The zones of the first lens and the second lens can be arranged in rows and columns, and the pattern selector can include a row selector and a column selector configured to select one or more rows and/or one or more columns of zones in each lens for inclusion in the first set of zones and the second set of zones.

Vision training systems comprise eyewear configured to selectively obscure a portion of a trainee's field of view, and a pattern generator configured to select and temporally vary the obscured portion of the trainee's field of view. A computer readable medium such as random access memory (RAM) can be configured to record the obscured portions of the field of view selected by the pattern generator, or to store a sequence of field obscuration patterns to which the trainee is to be exposed. In some examples, the pattern generator temporally varies the obscured portion of the field of view by keeping a transmissive state duration approximately constant and altering a substantially non-transmissive state duration. Obscuration patterns can be selected to obscure portions of a visual field at or near a line of sight (such as a normal line of sight or an activity specific line of sight), or to obscure portions of the visual field displaced from the line of sight. In some examples, moiré patterns are used.

Training methods comprise providing at least one obscuration pattern in a visual field of at least one eye of a trainee, and exposing the trainee to a performance challenge. For example, a portion of a batter's field of view can be obscured, and then the batter can be put in a normal hitting situation. The obscuration pattern presented to the trainee can be time varying during the exposure, and typically includes a plurality of obscuration zones. In some examples, a sequence of obscuration patterns is provided and obscuration patterns are provided in the visual field of each eye of the trainee. Typically, trainee response to the performance challenge is recorded to determine additional training conditions, or to assess progress.

The foregoing and other objects, features, and advantages of the disclosed technology will become more apparent from the following detailed description, which proceeds with reference to the accompanying figures.

DETAILED DESCRIPTION

As used herein, the singular forms "a," "an," and "the" include the plural forms unless the context clearly dictates otherwise. Additionally, the term "includes" means "comprises." The described systems, apparatus, and methods should not be construed as limiting in any way. Instead, the present disclosure is directed toward all novel and nonobvious features and aspects of the various disclosed embodiments, alone and in various combinations and sub-combinations with one another. The disclosed systems, methods, and apparatus are not limited to any specific aspect or feature or combination thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show all the various ways in which the disclosed systems, methods, and apparatus can be used in conjunction with other systems, methods, and apparatus.

Figure 1:
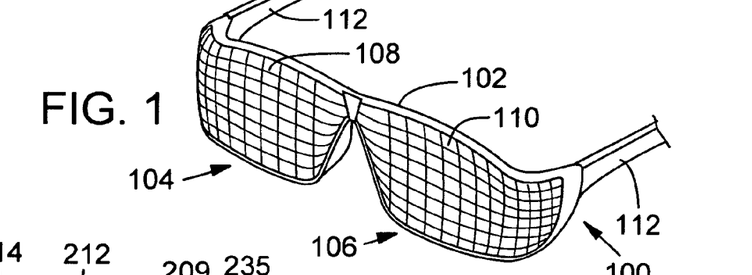
FIG. 1 illustrates a representative example of vision training eyewear.

Referring to FIG. 1, training eyewear 100 includes a frame 102 that is adapted to retain a first lens 104 and a second lens 106. In some examples, the lenses 104, 106 can provide optical power such as typically used to correct nearsightedness, farsightedness, astigmatism, or other visual defect, but the lenses 104, 106 can also be configured to provide little or no optical power for such corrections. The lenses 104, 106 include respective pluralities of segments or zones such as representative zones 108, 110 that are labeled in FIG. 1. For convenience in the following description, all zones of the lenses 104, 106 are referred to occasionally as zones 108, 110, respectively. The zones 108, 110 have optical properties that can be adjusted, selected, or established with, for example, electrical signals applied to the segments (zones). For example, the segments can be defined with liquid crystal materials such as polymer dispersed liquid crystals, nematic liquid crystals, cholesteric liquid crystals, or other electrically switchable optical materials that are situated between transparent conductive layers that are patterned to produce selected segment geometries. Liquid crystal materials are convenient due to their relatively low drive voltages, but other electro-optical materials such as, for example, electrophoretic materials or so-called "electronic inks" that have been developed for flexible flat panel displays can be used.

While the eyewear of FIG. 1 includes separate lenses for a left eye and a right eye, in other examples a single lens pane can be provided that is situated appropriately with respect to each eye. In some examples, a lens or portions of a lens pane for one eye is configured to substantially obscure vision through the associated eye. Such obscuration can be achieved with, for example, opaque, translucent, or other light blocking and/or light scattering lens regions or lens pane regions. In some examples, one of the lenses or lens pane regions can be patterned so as to be selectively switchable to be substantially obscuring or substantially transparent without being configured to display patterned obscurations.

As shown in FIG. 1, the zones 108, 110 are arranged in an approximately rectangular grid, but zones can be otherwise arranged. In addition, the zones 108, 110 have approximately the same area, but in other examples, zone areas can be arranged so that some areas are substantially bigger or smaller, and zone area can change gradually or abruptly as a function of, for example, horizontal or vertical position of a zone with the eyewear in an as worn position, or zone area can be a function of a distance from a lens center such as a geometric center, or a center determined by an intersection of a wearer's straight ahead line of sight with the lens in an as worn position. Rectangular or other regular arrangements of zones can be used, and rows/columns of zones of such arrays can be arbitrarily oriented, and need not be horizontal or vertical.

The zones 108, 110 can be electrically coupled to a lens driver that is secured to, for example, a temple piece 112 or other portion of the eyewear, or that is independently locatable so that the driver can be secured to, for example, an armband, a pocket, or a waistband as may be convenient. A lens driver can provide electrical control signals that actuate some or all of the zones to become substantially opaque, transparent, or otherwise vary a zone transmittance. The zones can be configured to provide electrically variable spectral transmittances, so that a spectrum of transmitted light varies with the applied electrical drive. A pattern or arrangement of zones and a manner of actuation can be selected by the lens driver with a pattern generator or controller that is provided as part of the lens driver or provided separately. A remote lens driver or pattern generator can be coupled to the eyewear with an electrical cable. In some examples, patterns can be transmitted wirelessly to the eyewear so that a trainer can select an appropriate zone actuation pattern without interfering with the wearer's activity.

The zones 108, 110 can be activated in a variety of zone actuation patterns based on a geometrical arrangement of activated zones, a temporal sequence in which zones are actuated, a rate of zone actuation, a progression of zone patterns, or other spatially and/or temporally variable or fixed configurations. For example, some or all zones can be activated to obscure a wearer's vision in a temporal sequence so that initially the relative duration of obscuration is small and the duration of the obscuration gradually increases. Zones can be selected to provide obscuration based on selected activity-specific or sport-specific situations. For example, in training a batter for improved central vision to track a baseball, a central portion of a field of view can be partially or completely obscured with a static or time varying adjustment of zone transmittances. Although in this example, central vision is trained, the activated zones may not be central zones of eyewear lenses, but can be selected based on the relative head position and line of sight of the batter with respect to pitch trajectory.

Zones or selected groups of zones can be selected to obscure portions of a wearer's field of view. For convenience, an arrangement of one or more zones is referred to therein as an obscuration pattern. An extent to which a zone or an obscuration pattern modulates light transmission or light emission is referred to as an obscuration intensity. A series of one or more activated obscuration patterns is referred to as a sequence. A rate at which an activation pattern or patterns in a sequence are activated can be referred to as a strobe rate. A strobe rate can be a fixed or variable frequency. In some examples, the same or similar patterns and sequences are directed to a left lens and a right lens, but different patterns, sequences, and timings can be provided to the different lenses. Sequences and patterns can also be applied to lenses with different phases. For example, a pattern can be activated at a left lens, and then, upon partial or complete deactivation of the pattern, a corresponding or different pattern can be activated at a right lens. In some examples, actuation of patterns on a left and right lens is substantially simultaneous (in phase), while in other examples one is activated only when the other is deactivated (out of phase).

Figure 2:
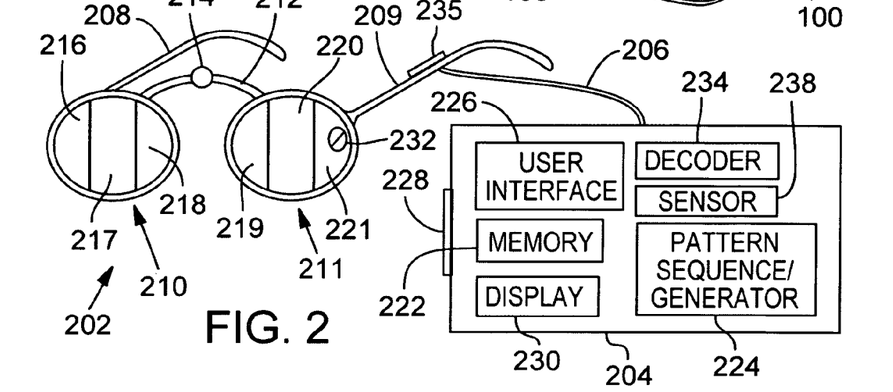
FIG. 2 illustrates a vision training system that includes vision training eyewear.

A representative vision training system that includes switchable eyewear 202 and a control system 204 is illustrated in FIG. 2. The control system 204 is coupled to the eyewear 202 with a flexible electrical cable 206 that is configured to communicate electrical signals to and from the eyewear 202. The eyewear 202 includes temple pieces 208, 209, lenses 210, 211 and a bridge 212. The lenses 210, 211 are typically retained by lens rims defined in a frame front that also includes the bridge 212, but other eyewear configurations such as rimless eyewear can be used. A light sensor 214 can be situated in or on the bridge 212 or other location on the eyewear 202. As shown in FIG. 2, the lenses 210, 211 include zones 216, 217, 218 and 219, 220, 221, respectively, but more zones or different arrangements of zones can be provided.

The control system 204 includes a remote lens driver/decoder 234 that is adapted to provide suitable electrical signals to the lens zones 216-221. In some examples, the lens driver 234 is configured to provide electrical signals by selectively addressing the zones row by row or column by column as is customary in addressing liquid crystal display panels. For lenses having only a few zones, each zone can be individually addressable with dedicated conductors. It can be convenient to provide signal decoding or distribution on the eyewear to simplify electrical connections to the control system 204 to avoid, for example, the need to provide multiple row and column signals over the cable 206. In some examples, the control system 204 or some portions thereof are secured to or integrated into the bridge, temple pieces, or other portions of the eyewear 202. In FIG. 2, a frame-mounted decoder 235 is situated on the left temple piece 209. In other examples, the control system or portions thereof are configured for attachment to a eyewear user's clothing, body, or equipment.

The control system 204 can also include a memory 222 and a pattern generator/sequencer 224. The memory 222 can be configured to store obscuration patterns and temporal sequences for activation of such patterns as well as to record training data corresponding to the durations and sequences in which the eyewear has been used in training sessions. The pattern generator/sequencer 224 can be configured to determine pre-established pattern sequences or obscuration patterns for use. In addition, patterns and sequences can be modified or adapted in response to, for example, input commands or other use inputs received via a user interface 226. In some examples, the user interface 226 is configured for selection of patterns and sequences, and can include one or more user controls such as knob, sliders, push buttons, or other input devices. Typical adjustments relate to a rate at which a particular pattern is repeated or a rate at which a sequence of patterns is provided. For example, an obscuration pattern can be strobed at a high rate (greater than about 30 Hz) so that the strobing is noticed by the wearer primarily as a reduced transmitted light intensity. Alternatively, a pattern can be strobed at a rate at which the wearer notices an interval in which her vision is impeded. Typically rates less than about 15 Hz are associated with noticeable obscurations. A constant strobe rate is unnecessary. For example, a strobe rate can vary from a high rate to a low rate so that the visual obscuration presented to the wearer increases, increasing the visual demands on the wearer. Such variable frequency drive can be referred to as a "chirped" drive.

An external input/output connection 228 such as a Universal Serial Bus (USB) or other communication connection can be provided. Such a connection can be coupled to the pattern generator/sequencer 224 to provide or adjust patterns and sequences available for use. Additional patterns and sequences can also be received from the connection 228 for storage in the memory 222. In some examples, a vision training schedule can be transferred to the control system 204 for one or more future training sessions. The training schedule can be transferred from the athlete's computer, or forwarded to the athlete from a trainer over a network such as the Internet. In addition, data concerning usage can be delivered to the connection 228 for inclusion in, for example, a record of an athlete's training schedule. Such a record can be forwarded to a coach or trainer via a network such as the Internet or using email or instant messaging.

A display controller 230 is configured to control a display portion 232 of the lens 211. The display portion 232 typically includes a plurality of display pixels so that information concerning current eyewear or training settings or conditions can be presented in a user's field of view. In some examples, the display portion includes a single pixel that can be strobed or otherwise actuated to indicate eyewear status. For example, a rapidly strobing display portion 232 can indicate a pattern rate or a duration of a training session.

The light sensor 214 is in communication with a sensor processor 238 that can provide an indication of, for example, ambient lighting in an environment in which the eyewear 202 is situated, or direct lighting received by the eyewear 202. Obscuration patterns, sequences, and intensities can be varied based on the indication. The processor 238 generally includes an amplifier or buffer that can receive an electrical signal from the light sensor 214 and provide an output signal indicative of light received. For example, an overall illumination level can be established so that, for example, a wearer's eyes receive a similar light flux regardless of ambient illumination conditions.

Differing obscuration patterns and sequences can be supplied to the left and right lenses. In some examples, vision from a single eye is to be trained, and only the corresponding lens is used. In other examples, the lenses are selected at random intervals to serve as distractions such as might be encountered due to, for example, fan motion, or other regular or irregular movements at a sporting event.

Figure 3:
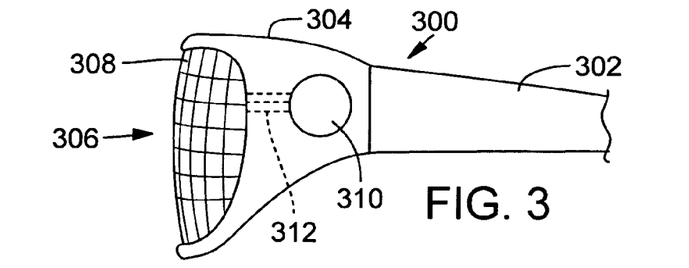
FIG. 3 illustrates example vision training eyewear.

FIG. 3 illustrates representative vision training eyewear 300 that includes a temple piece 302, a frame front 304, and a lens 306. The lens 306 includes zones such as representative zone 308. A control switch 310 is provided and is electrically coupled to the lens zone with an interconnect 312 that is include in the frame front. The control switch 310 can be adapted to activate the zones or select patterns or pattern sequences. For example, the switch 310 can include a rotating portion that can select pattern strobe rate, and a push mechanism for turning the eyewear on and off.

Figure 4:
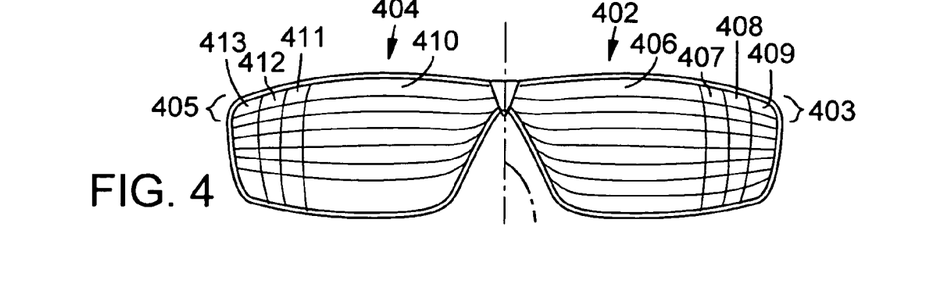
FIGS. 4-6 illustrate representative arrangements of zones in lenses for vision training eyewear.
Figure 5:
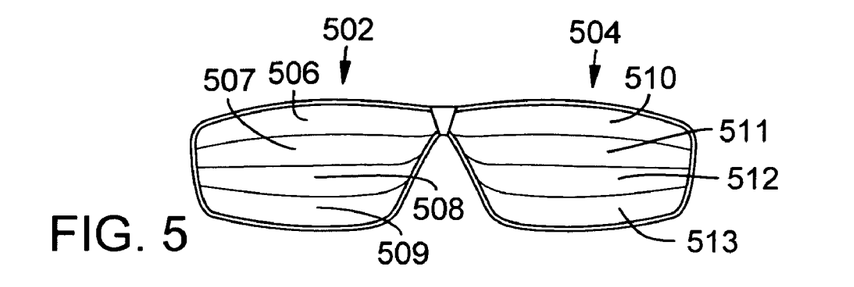
Figure 6:
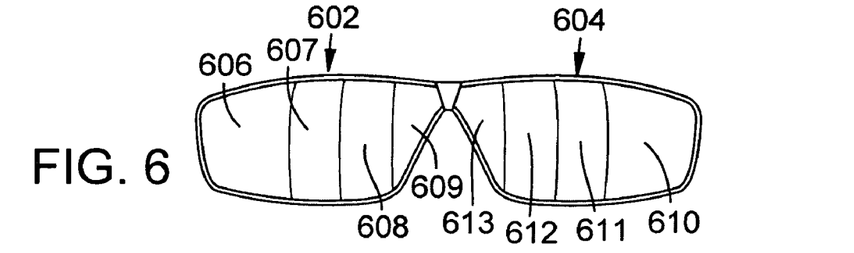

FIGS. 4-6 illustrate representative arrangements of zones. As shown in FIG. 4, lenses 402, 404 include representative rows 403, 405 having zones 406-409 and 410-413, respectively. Zones situated closer to a frame axis 420 tend to be larger, while zones situated more distant from the frame axis 420 tend to be appreciably smaller.

Referring to FIG. 5, lenses 502, 504 include zones 506-509 and 510-513, respectively. These zones extended primarily horizontally when the lenses 502, 504 are in an as-worn position. FIG. 6 shows lenses 602, 604 that include vertically disposed zones 606-609 and 610-613, respectively.

Lenses for vision training eyewear can include a lens substrate, such as a lens blank of glass, polycarbonate, acrylic, or other suitable optical material. The substrate can be configured to define both a left and a right lens or separate substrates can be used for each. Substrates can be tinted or colored to control total transmittance and/or provide a predetermined spectral transmittance, or can be made of photochromic materials. A lens substrate typically has a posterior surface (facing the wearer) and an anterior surface (facing away from the wearer) in an as worn position. Curvatures and centers of curvature of one or both of these surfaces can be selected to provide a preferred optical correction, or to be substantially optically neutral. For convenience, a positive curvature is defined as a curvature whose center is on a posterior side of a lens substrate in an as worn position. Curvatures of the surfaces typically are selected to be between about 0 diopter and +14 diopters.

Vision training lenses also include a zone-switchable optical modulator that can be conformed to or bonded to an anterior surface or a posterior surface of the lens substrate. Such optical modulators can be flexible for attachment to surfaces having optical curvatures of 4 diopters or more. Optical modulators can be bonded to both surfaces if desired. The modulator generally includes an optically active (i.e., switchable) area and an interconnection portion (typically at a perimeter) that is adapted to receive control signals and deliver the control signals to the switchable zones directly or to a zone driver decoder that establishes, for examples, appropriate row and column conductor signals for matrix addressing. Flexible liquid crystal-based modulators are convenient.

Figure 7:
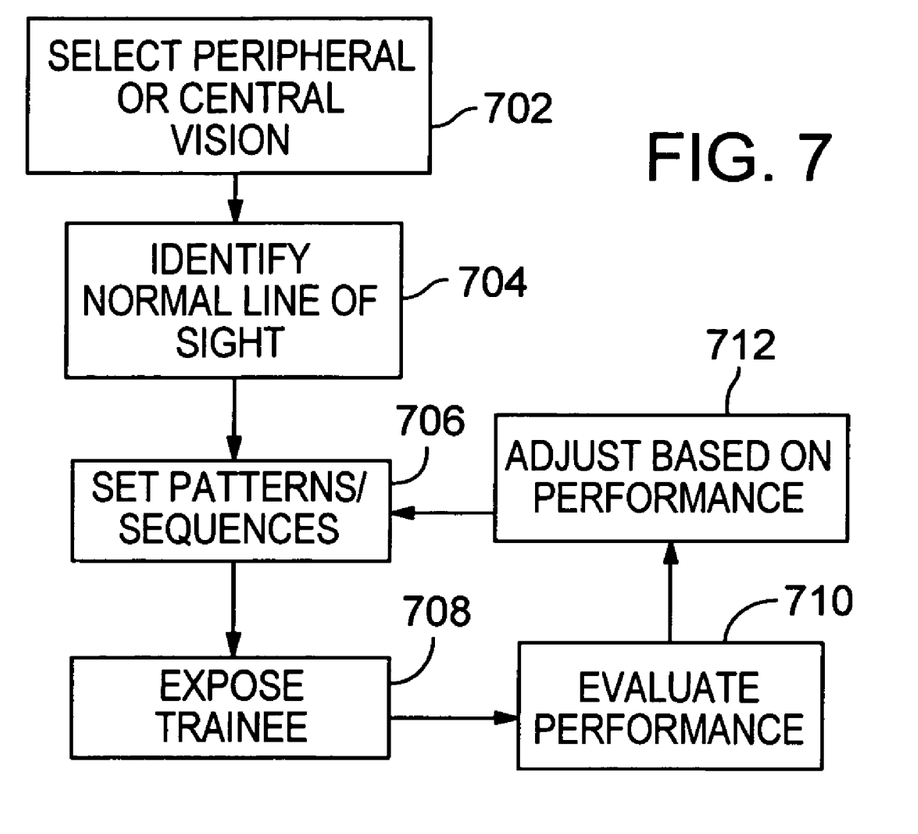
FIG. 7 illustrates a representative vision training method using obscuration zones.

FIG. 7 illustrates a representative vision training method based on selective visual field obscuration. In a step 702, a portion of a user's visual field is selected for training, typically either a central portion or a peripheral portion. Peripheral portions tend to be less sensitive to color based obscuration than central portions, and while color can be used, different colors typically present similar visual challenges. In contrast, in a central portion (one that is typically associated with images received on the fovea), colors can be used to provide color-based visual challenges. In a step 704, a normal line of sight of a trainee is determined. This normal line of sight can be an activity specific line of sight. For example, a volleyball player typically has an upward line of sight. An intersection of the normal line of sight with vision training eyewear in an as-worn position can be used to select which zones should be activated to provide central or peripheral visual challenges. In a step 706, obscuration patterns/sequences are selected, and in a step 708, a trainee is exposed to a test situation while her visual field is obscured by the selected patterns/sequences. The test situation can be sport-specific situation (hitting or fielding a baseball, trapping a soccer ball, etc) or a more general test situation. In a step 710, trainee performance is assessed, and in a step 712, patterns/sequences are adjusted based on test results. Pattern/sequences and adjustments thereto can be provided by, for example, a monitoring computer system that provides a user interface for selecting patterns/sequences/timing, and that receives training results so that patterns/sequences can be adjusted without user intervention and in substantially real time so that the trainee can be exposed to appropriate visual challenges.

While frame-based eyewear can be convenient for general use and activity-specific training, activity-specific eyewear, visors, face shields, or protective shields can be similarly configured. For examples, obscuration zones can be provided on a face shield adapted for a football, hockey, or lacrosse helmet or other head protector. Goggles and facemasks for racquet sports, lacrosse, and baseball can also be configured to include vision shield portions on which pluralities of switchable zones can be defined.

Figure 8:
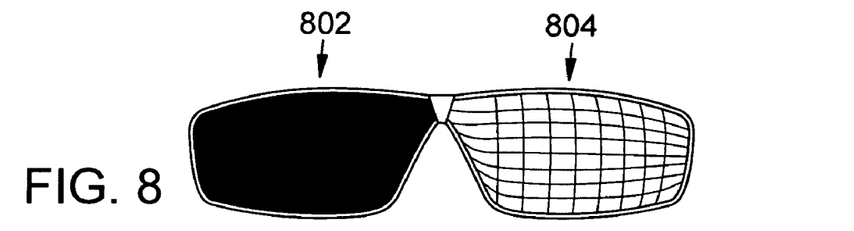
FIGS. 8-12 illustrate representative obscuration patterns presented using exemplary vision training eyewear that include zones arranged in rows and columns.

FIGS. 8-12 illustrate representative patterns that can be presented on eyewear such as those of FIG. 1. FIG. 8 illustrates a right lens 802 that is switched so as to be substantially light attenuating over the entire visual field subtended, while a left lens 804 is unactivated. The left lens 804 can be similarly activated at all zones either in phase or out of phase with the pattern on the right lens 802, or the left lens 804 can remain unactivated.

Figure 9:
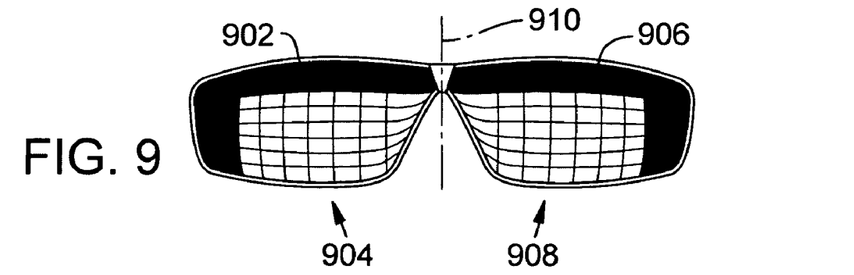

FIG. 9 illustrates an obscuration pattern 902 presented on a right lens 904 and an obscuration pattern 906 presented on a left lens 908. The patterns 902, 906 are symmetric with respect to an axis 910. These patterns can be strobed in phase, out of phase, at a constant rate, or at a variable rate as preferred. Light attenuation or emission can be selected to provide a visual challenge, and can be the same or different on each lens.

Figure 10:
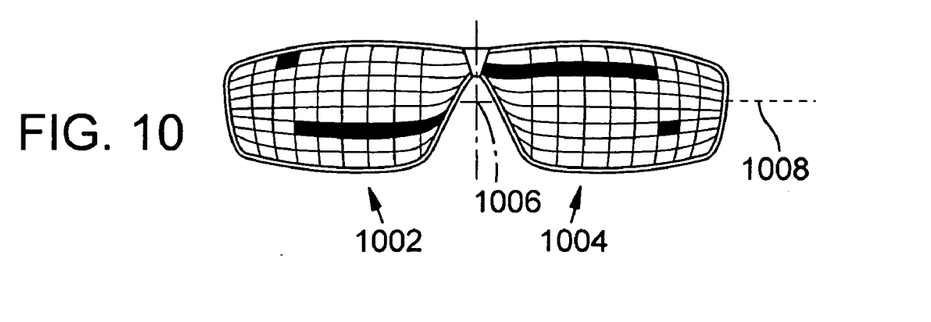
Figure 11:
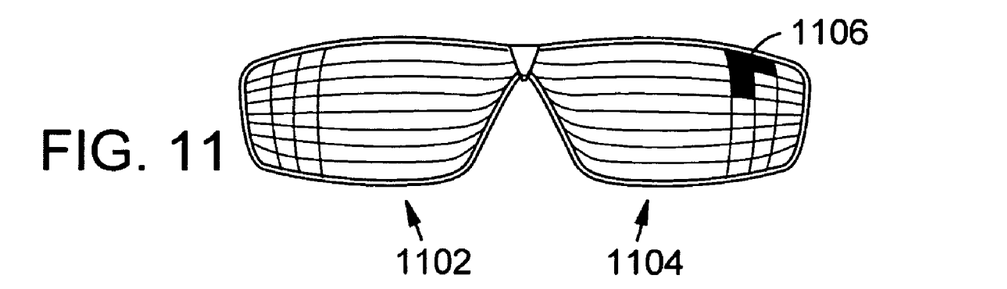
Figure 12:
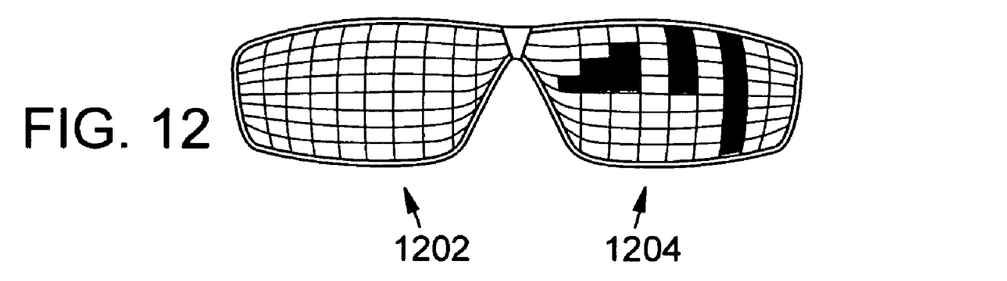

FIG. 10 illustrates zone patterns on a right lens 1002 and left lens 1004 that have approximate inversion symmetry with respect to a point 1006 that is at an intersection of a vertical axis 1006 and a horizontal axis 1008. FIG. 11 illustrates a pattern 1106 defined on a left lens 1104, while no patterns are provided on right lens 1102. FIG. 12 illustrates an additional pattern defined on a left lens 1204, while patterns are not provided on a right lens 1202.

Figure 13:
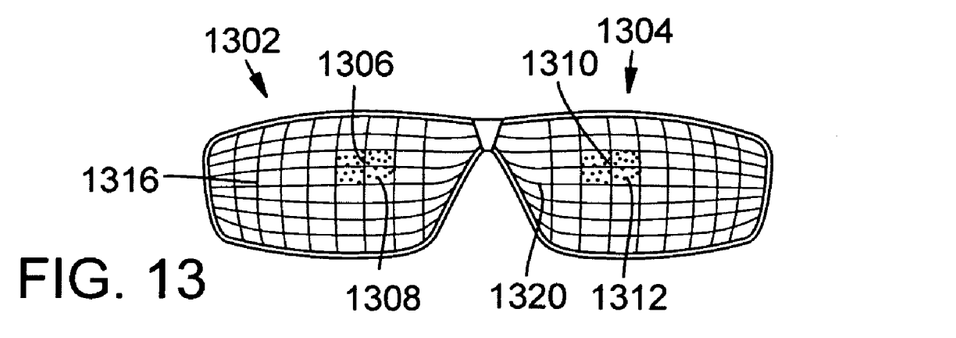
FIG. 13 illustrates an obscuration pattern based on zones situated about a normal line of sight with eyewear in an as worn position.

FIG. 13 illustrates a right lens 1302 and a left lens 1304 having respective intersections 1306, 1310 of a wearer's normal line of sight (NLOS) with the lenses 1302, 1304 in an as worn position. Obscuration patterns 1308, 1312 are situated at the intersections 1306, 1310. In other examples, zones at the intersections are not activated, while zones more distant from the intersections 1306, 1310 are activated. Representative intersections 1316, 1320 of an activity specific LOS are indicated, and obscuration patterns can be situated at these intersections.

In other examples, vision training apparatus such as single lens or dual lens eyewear (for example, eyeglasses or goggles), protective shields (for example, hockey face shields), or fixed apparatus (for example, a stationary viewing or protective screen) can be configured to present obscurations based on moiré patterns. Moiré patterns are generally considered to be interference patterns that are formed by the superposition of two or more repetitive patterns such as grid patterns or other periodic or aperiodic patterns such as the alternating transparent and opaque strips provided by Ronchi rulings. One or more electrically switchable pattern layers can be defined so that pattern regions are selectable to present moiré patterns in the user's visual field. For example, a lens can include a first pattern layer and a second pattern layer, wherein the first and second layers are offset with respect to each other. Pattern segments of one or both of the pattern layers can be selected to provide obscurations that include a moiré pattern. For example, the first pattern layer and the second pattern layer can be based on the same pattern. One of the pattern layers can be selectively switched to produce obscuration patterns in which various combinations of the pattern segments in the first pattern layer are activated. Moiré patterns can be produced by selectively switching pattern segments in both the first pattern layer and the second pattern layer. In this way, both moiré and other patterns can be provided. In some examples, one of the pattern layers can be configured so that substantially all pattern segments are normally activatable together, but are not individually selectable.

While patterns can be provided based on interference of two or more patterns established by two active pattern layers, in other examples, an active pattern layer (i.e., a pattern layer in which at least some pattern segments have transmittances or other optical properties that can be selectively switched) can be combined with a fixed pattern layer. Moiré patterns can then be presented based on selective activations of pattern segments in the active pattern layer in combination with the fixed pattern layer. Moiré patterns can also be provided with a switchable viewing screen in combination with a fixed pattern. In some training situations, two fixed patterns can be used, and a moiré pattern selected based on a relative angular or linear displacement of the fixed patterns. Eyewear systems can provide electrically switchable eyewear and a separate fixed pattern layer that can have a user selectable angular displacement about a visual line of sight or linear displacement perpendicular to the visual line of sight. For convenience, both such displacements are referred to herein as displacements with respect to a line of sight.

The patterns illustrated in FIGS. 7-13 are examples, and other patterns are possible. For example, a randomly varying checkerboard pattern can be used to obscure some or all portions of a wearer's visual field. In addition, pattern sequences can include a series of substantially dissimilar patterns, a selected pattern to which adjacent zones are added or from which peripheral zones are removed, and a pattern can be stepped across a lens. Different zones in a pattern can be associated with different colors, and color assignments can be varied. One or more zones can be randomly actuated to provide visual distractions.

While vision training eyewear can be configured for convenient use in a variety of activity-specific situations or other training situations, obscuration patterns can also be provided for vision training without eyewear. For example, a vision training window can be provided, and obscuration patterns and sequences of such patterns can be provided on the vision training window. In a representative example, a glass, plastic, or other transparent window can be provided with switchable zones, and the trainee situated behind the window with respect to a visual training stimulus. In other examples, a vehicle windshield can be similarly configured so that vehicle operators can be presented with visual challenges.

The examples described above include obscuration patterns or zones that block or partially block a portion of a field of view. However, other kinds of obscuration patterns and obscuration zones can be used. For example, light emitting zones can be provided so that a wearer's field of view is presented with regions of increased light emission that tend to obscure view. Such emission zones can be configured to provide temporally varying light emission, including spectrally varying light emission. If desired, such light emission can also be configured to have a spatially and/or temporally varying polarization. The zones can occupy substantially the entire area of a lens, or can be configured to occupy only a small portion of the lens area. For examples, lenses that include opaque light emission regions can be configured so that the lenses are largely transparent. Accordingly, light attenuating zones and/or light emissive zones can be provided.

Figure 14:
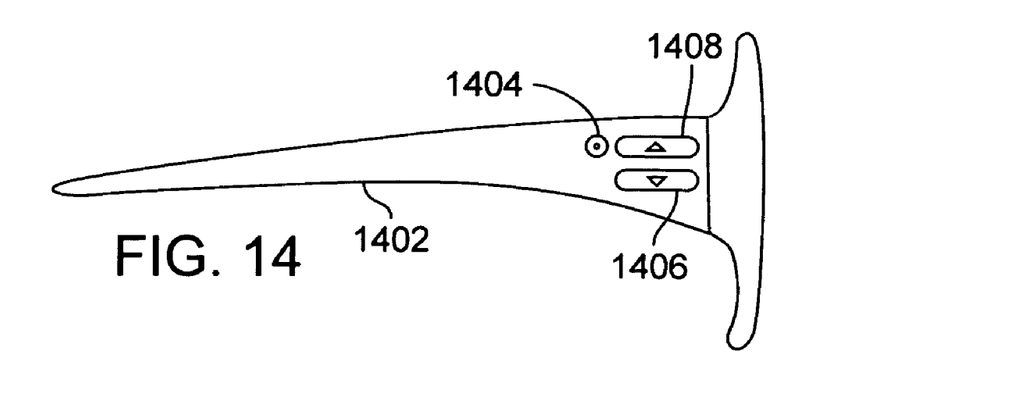
FIG. 14 illustrates a temple piece for vision training eyewear that includes controls for selecting a level of visual difficulty provided by the eyewear.

FIG. 14 illustrates a temple piece 1402 for exemplary vision training eyewear. The temple piece 1402 includes a power button 1404 and level adjust buttons 1406, 1408 that can be used to decrease or increase the visual challenge (i.e., the level of difficulty) that the eyewear provides. These buttons are located on the temple piece 1402 for convenient adjustment while in use. The power button 1404 can be configured to initiate and terminate operation of the vision training eyewear. In addition, the power button 1404 can be configured so that pressing the button can be used to toggle among strobing of a right lens only, strobing of a left lens only, or strobing of both lenses. The power button 1404 can also be configured to sequence through a predetermined menu of zone patterns or sequences, but it can be more convenient to provide an additional selection button to facilitate these or other user adjustments. The level adjust button 1408 can be configured so that pressing the level adjust button 1408 increases a difficulty level until a maximum available difficulty level is reached at which point additional button presses have no effect. Operation of the level adjust button 1406 can be similar at a minimum difficulty level.

Figure 15:
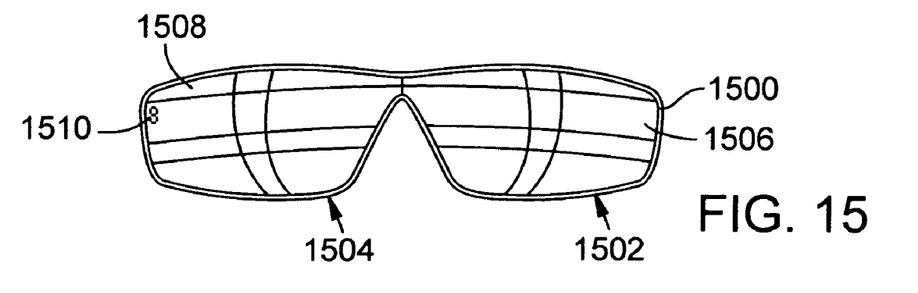
FIG. 15 illustrates left and right lenses that include a plurality of zones, wherein the right lens includes a display region for a seven segment display.

FIG. 15 illustrates an arrangement of zones in a left lens 1502 and a right lens 1504 that can be controlled with a temple piece such as that of FIG. 14. As shown in FIG. 15, the left lens 1502 and the right lens 1504 are formed as a unitary lens assembly 1500, but can be provided separately as well. A display region 1510 is also provided to permit communication of eyewear settings to the user. As shown in FIG. 15, a seven segment display is convenient. The lenses 1502, 1504 include representative zones 1506, 1508, respectively. The remaining zones are unlabeled in FIG. 15. In some examples, the zones provide variable light attenuation. While the zones can be controlled to be substantially clear, substantially opaque, or have intermediate values of light transmission, example operation of eyewear that includes the temple piece 1402 and the lenses 1502, 1504 is described with zones that are referred to as configurable to be in a "clear" state or a "dark" state.

Figure 16A:
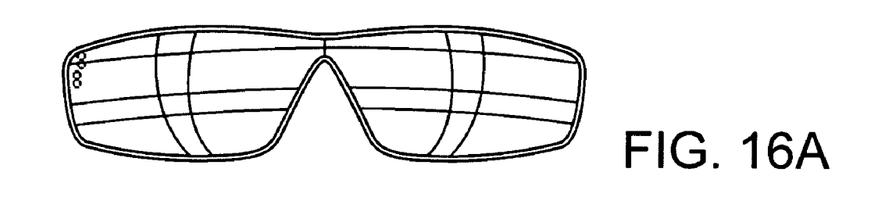
FIGS. 16A-16B illustrate a clear state and a dark state for the lenses of FIG. 15.
Figure 16B:
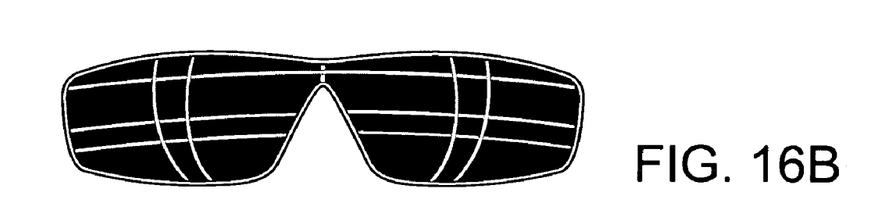
Figure 17A:
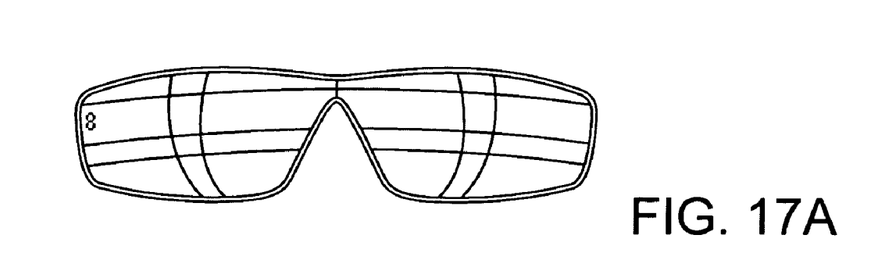
FIGS. 17A-17B illustrate a clear state and a dark state for the left lens of FIG. 15 while the right lens remains in a clear state.
Figure 17B:
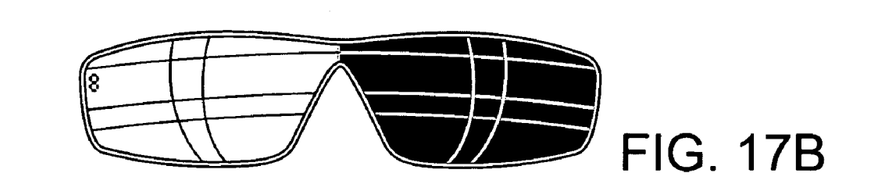
Figure 18:
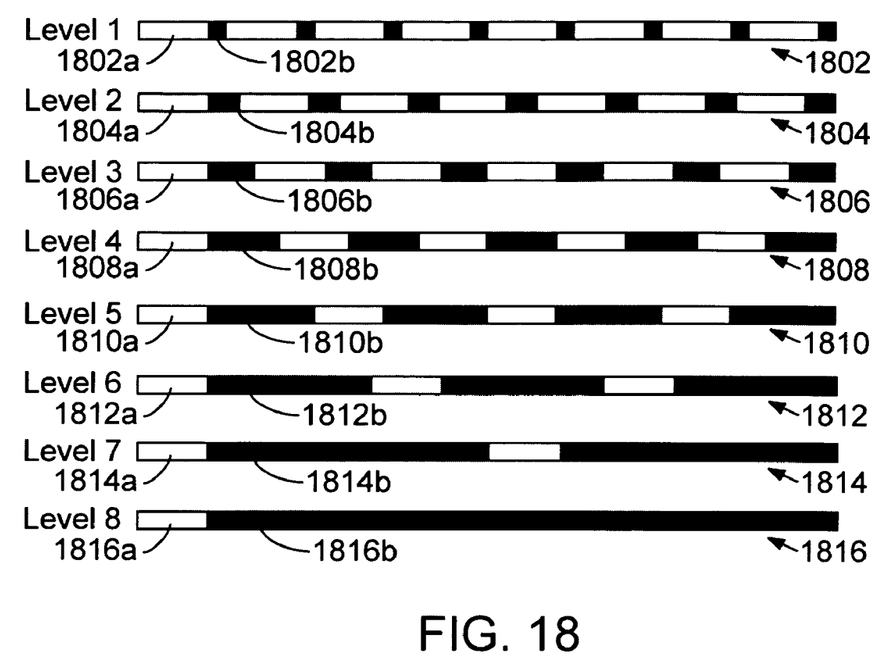
FIG. 18 illustrates clear state and dark state durations that are used to define a series of levels of visual difficulty provided by vision training eyewear.
Figure 19:
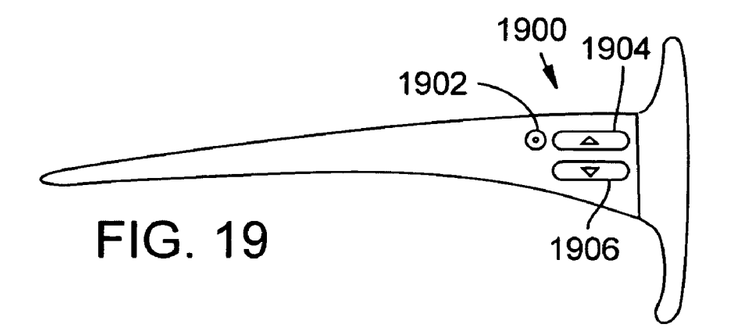
FIG. 19 illustrates a portion of a representative temple piece for vision training eyewear that includes controls for selection of rows and columns of zones.

Operation of the lenses of FIG. 15 is illustrated in FIGS. 16A-16B, 17A-17B, and 18. When the lenses are powered on using the power button 1404, an initial or default difficulty level is displayed in the display region 1510 and the lenses remain in the clear state. The default difficulty level can be an easiest level and assigned an indicator of "1" that is displayed when the lenses are powered on. After a brief interval (for example, 2-10 sec), the zones of the lenses 1502, 1504 begin to strobe at a rate associated with the initial difficulty level, and the display 1510 can be switched off. Strobing of one or both lenses can be set as an initial mode of operation that can be controlled with the power button 1404. Additional presses of the power button 1404 cycle through selection of a left lens, a right lens, and power off. Typically, with the eyewear switched off, pressing the power button 1404 initiates the eyewear with both a left and a right lens alternating between a clear state and a dark state. FIGS. 16A-16B illustrate the eyewear during a clear state and a dark state, respectively, in which all zones are switched. Alternatively, the zones of only one lens can be switched as illustrated in FIGS. 17A-17B. Difficulty level can be adjusted at any time, and a new difficulty level displayed in the display region 1510 A representative arrangement of eight levels of difficulty is illustrated in FIG. 18. Durations of clear state intervals and dark state intervals for an "easiest" level 1802, a "hardest" level 1816, and intermediate levels 1804, 1806, 1808, 1810, 1812 are shown. In the example levels of FIG. 18, clear state intervals 1802a, . . . , 1816a have a fixed duration of 0.1 sec, while dark state intervals 1802b, . . . , 1816b have durations that increase with increasing level of difficulty. For example, the most difficult level 1816 provides a 0.9 sec interval of obscuration during which the wearer's vision is obstructed. For all the levels of FIG. 18, a repetitive sequence of clear state/dark state intervals are provided and a clear state/dark state intervals for a representative 1 sec time period are shown. Durations of dark state intervals for levels 1-8 are listed in the following table.

| Level | Dark State Duration (sec) |
| --- | --- |
| 1 (easiest) | 0.025 |
| 2 | 0.043 |
| 3 | 0.067 |
| 4 | 0.100 |
| 5 | 0.150 |
| 6 | 0.233 |
| 7 | 0.400 |
| 8 (hardest) | 0.900 |

This arrangement of clear state/dark state intervals is an example, and other arrangements can be used, including those in which both clear state and dark state interval durations are varied, or a frequency at which clear state/dark state intervals are switched. At frequencies greater than about 10-20 Hz, alternating clear and dark levels tend to merge and can be perceived as gray. This merger occurs at different frequencies for central vision and peripheral vision, and peripheral vision tends to note flicker at higher frequencies. Durations of dark/light intervals can be selected based on such merger. Visual challenges can be more noticeable at rates at which flicker is observed, or at lower rates.

Levels of difficulty can also be associated with the pattern or sequence of zones that are controlled to be in a clear state or a dark state, and level adjustment is not limited to clear state/dark state interval durations. Level adjust buttons can be configured to alter obscuration patterns, sequences, and/or timings to select visual challenges.

Figure 21:
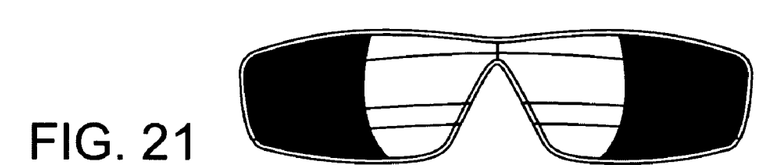
Figure 22:
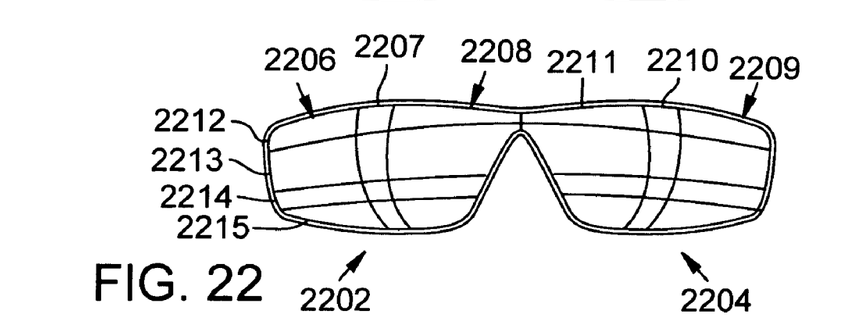
Figure 23:
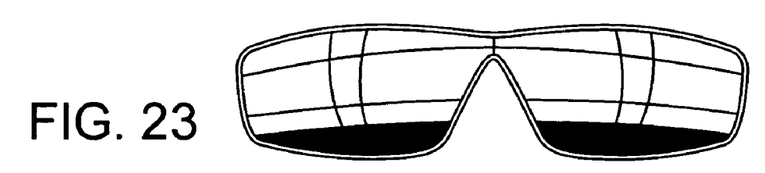
Figure 24:
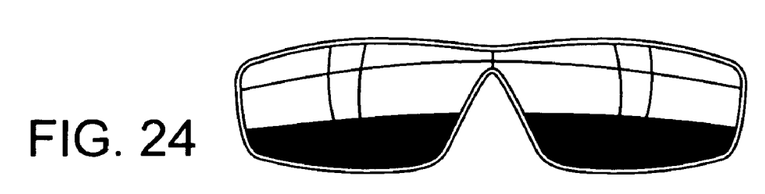
Figure 25:
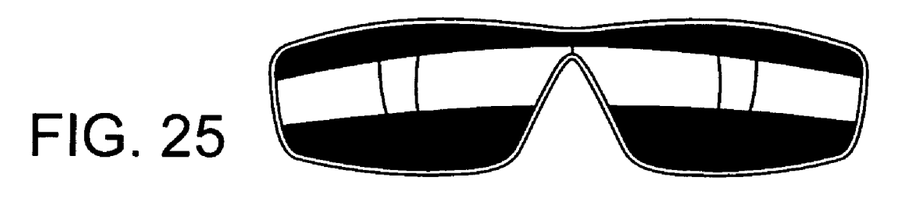
Figure 26:
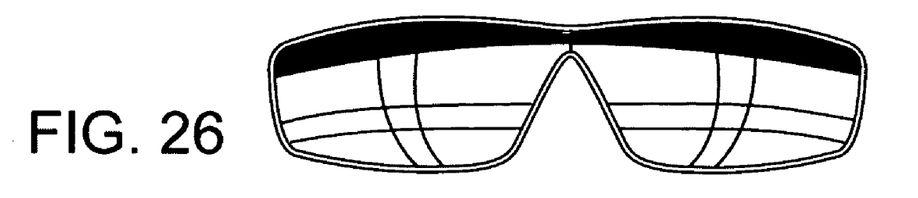
Figure 27:
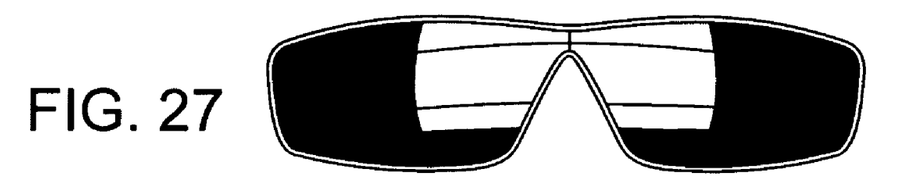
Figure 28:
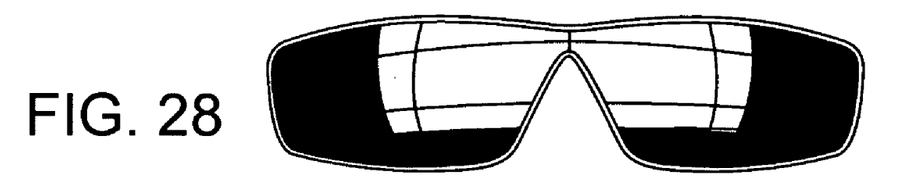
Figure 29:
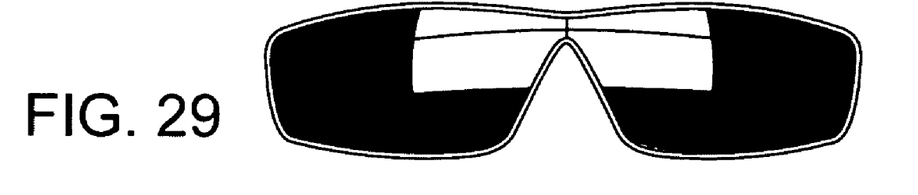
Figure 30:
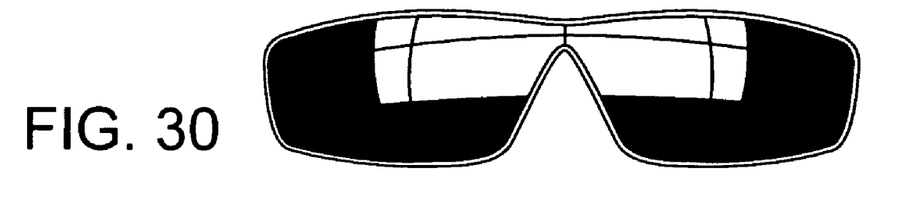
Figure 31:
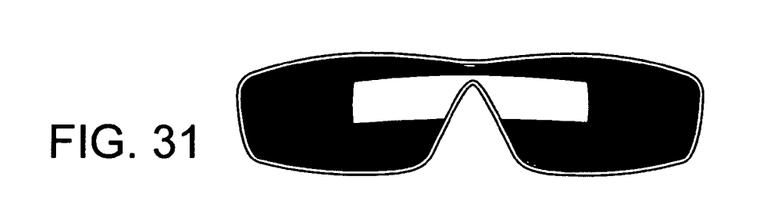
Figure 32:
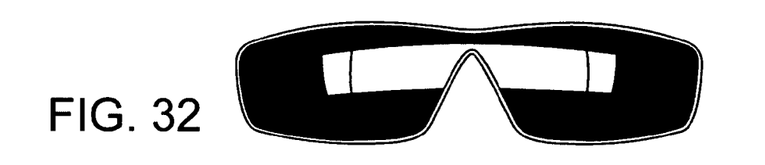

In another example illustrated in FIGS. 19-32, a temple piece 1900 is provided with a power switch 1902, a row selection switch 1904, and a column selection switch 1906. Repeated actuations of the switches 1904, 1906 permitting selection of different rows or columns of zones, respectively. Zone timing can be altered with repeat actuations of the power switch 1902. As shown in FIG. 22, a lens assembly includes a right lens 2202 and a left lens 2204 that have three columns of zones 2206-2208 and 2209-2211, respectively. Four rows 2212-2215 of zones are also provided.

Figure 20:
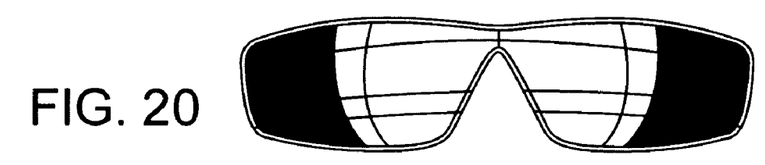
FIGS. 20-32 illustrate representative vision training eyewear in which lenses for each eye include 12 zones that are arranged in rows and columns.

The selection switches 1904, 1906 can be used to select rows and columns for actuation. FIGS. 20-21 illustrate actuation of columns 2206, 2210 in response to the selection switch 1904. FIGS. 23-26 illustrate actuation of the row 2215, the rows 2214-2215, the rows 2212 and 2214-2215, and the row 2212, respectively. FIGS. 27-32 illustrate combinations available using both selection switches 2204, 2206.

Figure 33:
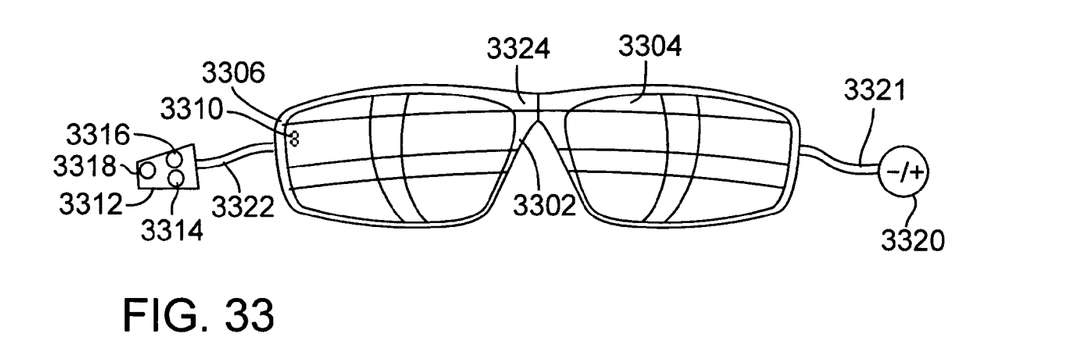
FIG. 33 illustrates representative vision training eyewear.

FIG. 33 illustrates a frame front 3302 that includes a left lens 3304 and a right lens 3306. Each of the lenses includes 12 zones (4 rows and 3 columns) and the lens 3306 includes a seven segment display 3310. A circuit board 3312 includes switches or pressure sensitive buttons 3314, 3316, 3318 to control operation of the lenses and electrically coupled to a battery 3320 via cables 3321, 3322. A frame front 3324 other portions of an eyewear frame can be used to provide electrical connections with conductors internal to or external to the frame. The lenses 3304, 3306 include flexible liquid crystal devices that are laminated between polycarbonate sheets.

Lens substrates of various kinds can be used in vision training eyewear. Typically, lens substrates should not present additional visual challenges. One example of a suitable lens substrates are the tilted, decentered lenses described in Reichow et al., U.S. Pat. No. 6,129,435 that is incorporated herein by reference. These lenses are low minus power lenses which have an optical axis that is angularly deviated at a sufficient angle away from parallel with the line of sight to minimize prismatic distortion, both along a line of sight and peripherally in the field of view. This lens is particularly adapted for protective, non-corrective eyewear in which the lens is mounted in a tilted orientation with respect to the line of sight. The optical axis of the lens is angularly deviated in a direction generally opposite the direction that the low minus power lens is to be tilted, which has been found to minimize optical distortion in the lens. This lens design reduces both yoked and vergence demands, as well as astigmatic blur, in eyewear made with such lenses.

Tilting a non-corrective plano lens toward the face induces prism base in the direction in which the lens is tilted. For example, when the inferior edge of a lens that is mounted with pantoscopic tilt is inclined toward the face, base down prism is induced. Typically, the optical axis of a low power lens is deviated generally superiorly, in a direction substantially opposite the direction of the prism induced by the tilt, to offset the tilt induced prism. Similarly, a lens mounted with lateral wrap (temporal edge inclined towards the face) induces base out prism, which is offset by angular deviation of the optical axis of a low power lens in a generally nasal direction. Lenses that are to be mounted with pantoscopic tilt and lateral wrap may therefore have an optical axis that is deviated both superiorly and nasally to minimize the prism induced by the tilt. Optical compensations for other directions of lens tilt can similarly be achieved by deviating the optical axis generally away from the inward tilt of the lens.

The low power lens may have any amount of minus power, up to that for a concentric lens for a given base curvature. Low power lenses may, for example, have more minus power than −0.005 diopter, for example more than −0.01 or −0.02 diopter and particularly in the range of −0.01 to −0.12 diopter, for example −0.04 to −0.09 diopter. Such low power lenses achieve a number of advantages. The low power lenses have less taper, and can be thinner than zero power lenses. The reduction in taper produces a corresponding reduction in peripheral prism that would otherwise be induced by the excessively non-parallel surfaces of the plano lenses. Thinner lenses also provide better physical stability, improved optical quality, lower weight, and more uniform light transmission than plano lenses. A physiologic advantage of the low minus lens is that it better matches the accommodative posture of athletes and other persons engaged in highly visually demanding and/or stressful activities.

The versatility of this lens design allows it to be applied to a wide variety of lenses having different degrees of lateral wrap, pantoscopic tilt, powers, center thicknesses, and lens surface curvatures, because the prism induced by the tilt ("prism by tilt") can be neutralized by altering a number of these factors. Hence a lens with substantial pantoscopic tilt may have a larger separation between the apex and the line of sight, and a corresponding increase in prism by tilt. This prism can be reduced by one or more of a combination of parameters, such as increasing the angle of deviation between the line of sight and optical axis, increasing the minus power of the lens, or reducing the base curvature of the lens.

Such designs are particularly well adapted to high base lenses, which are at least base 4 lenses, for example, a base 6-9 lens. The lens is also particularly suitable for use in dual lens eyewear, with lenses having a center thickness of about 1-3 mm (for example about 1.5-2.25 mm), a power of about −0.01 to −0.12 diopter (particularly about −0.04 to −0.09 diopter), a pantoscopic tilt of 3-20 degrees, and lateral wrap of 5-30 degrees. In particular examples, the lens is a 6 base lens with a center thickness of about 1.6 mm, a power of about −0.045 diopter, and the tilted orientation of the lens includes lateral wrap of about 15 degrees, a pantoscopic tilt of about 12.5 degrees, and the angular deviation between the optical axis and the line of sight (or a parallel to the line of sight) is about 22-23 degrees nasally and 18-19 degrees superiorly.

The lenses may be spherical, cylindrical, toroidal, elliptical, or of other configurations known in the art. However, a representative example is a spherical lens in which a substantially spherical anterior surface substantially conforms to a first sphere having a first center, and a substantially spherical posterior surface substantially conforms to a second sphere having a second center. The radius of the first sphere is greater than a radius of the second sphere, so that a lens thickness tapers away from an optical center of the low power lens (which may be on or off the lens), and an optical axis extends through the first and second centers of the spheres and the optical center of the lens. This optical axis is angularly rotated nasally and superiorly away from the parallel with the line of sight (to compensate for lateral wrap and pantoscopic tilt), to a sufficient extent to substantially offset prism induced by tilt (for example, reducing prism by at least 25%, 50%, 75%, or 100%). This angular deviation provides a lens having a broad spectrum of improved optical properties, including reduced prism (to substantially zero along a functional line of sight in optimal embodiments), reduced astigmatic blur along both the line of sight and peripherally, and reduced yoked and vergence demands.

While these decentered lens can be used as lens substrates, corrective lenses can be used. In addition, vision training and assessment can be conducted with corrective lens substrates and compared with uncorrected lens substrates (with vision correction supplied by contact lenses) to determine which correction is likely to provide superior performance.

While vision for enhanced athletic performance can be trained with the methods and apparatus described, such training can be readily applied to other activities in which enhanced vision can advance performance or safety. For example, operators of motorized or other vehicles can be trained for enhanced safety. In addition, the methods and apparatus described can be used with brain injured patients to stimulate recovery or assess injury, or to obscure vision in a dominant eye to promote perception using a weak eye.

Patterns or sequences for a left eye and a right eye can be activated at different frequencies, amplitudes (different light transmissions), duty cycles (different relative on/off durations), and phases. Patterns need not be switched at a constant frequency but can be at chirped or other variable frequencies or can be switched at random intervals. While lens transmittance is varied in some examples, a transmitted light state of polarization can be varied as well. Such polarization modulation can be conveniently provided with zones defined by nematic liquid crystals. The lenses can also be tinted or neutral gray to statically control light transmission, or photochromic substrates can be used.

Eyewear and eyewear systems are conveniently configured to present predetermined patterns and pattern sequences at fixed or variable rates. Typically, a user or trainer can select additional patterns, pattern sequences, obscuration extents, variable or fixed pattern rates, pattern colors or color sequences, or other vision obscurations. These additional training selections can be selected using a personal computer or other computer system that is configured to present a range of customization options for selection based by the user or trainer using a keyboard or pointing device such as a mouse. After these additional training sequences are designed, the sequences can be stored in a memory and communicated to the eyewear system for storage at an eyewear controller that may or may not be integral with the eyewear. Customization and pattern selection can be based on sport-specific functions, specific training goals, wearer physiology (eye separation, orbit asymmetry) or otherwise configured.

In view of the many possible embodiments to which the principles of the disclosed technology may be applied, it should be recognized that the illustrated embodiments are only preferred examples and should not be taken as limiting the scope of the technology. Rather, the scope is defined by the following claims. We therefore claim all that comes within the scope and spirit of the appended claims.

We claim:

1. Vision training eyewear, comprising:
a first lens having electrically variable spectral transmittance that creates an obstruction pattern, wherein the electrically variable spectral transmittance is controlled by a lens driver;
a second lens having electrically variable spectral transmittance, wherein the lens drive controls spectral transmittance of the second lens independently of the first lens;
a frame configured to retain the first lens and the second lens; the lens driver cycles the variable spectral transmittance of the first lens from a first spectral transmittance for a fixed duration and a second spectral transmittance for an adjustable duration;
wherein the first lens is comprised of a first plurality of zones;

wherein the first plurality of zones includes a first pattern layer and a second pattern layer, wherein the first and second pattern layers are situated to produce an obscuration pattern based on a superposition of patterns defined in the first and second pattern layers; and wherein the first and second patterns layers are configured to produce a moiré pattern.

2. The eyewear of claim 1, wherein the fixed duration is 0.1 seconds.

3. The eyewear of claim 1, wherein the adjustable duration is selected from 0.025, 0.043, 0.067, 0.1, 0.15, 0.233, 0.4, and 0.9 seconds.

4. The eyewear of claim 1, wherein the lens driver cycles the spectral transmittance of the first lens between the first spectral transmittance for a duration of 0.1 seconds and the second spectral transmittance for a duration selected from one of the following 0.025, 0.043, 0.067, 0.1, 0.15, 0.233, 0.4, and, 0.9 seconds.

5. The eyewear of claim 1, wherein the first lens and the second lens are the same lens blank.

6. The eyewear of claim 1, wherein the first lens and the second lens are different lens blanks.

7. The eyewear of claim 1, further comprising a user input receiver secured to the frame and configured to control power supplied to the first lens and the second lens.

8. The eyewear of claim 1, wherein the first lens comprises a lens substrate having an anterior surface and a posterior surface in an as worn position, wherein the anterior surface and the posterior surface have curvatures of at least 4 diopters.

9. The eyewear of claim 1, wherein the first lens comprises a low minus power lens substrate to be mounted in front of an eye, tilted toward a face, wherein the lens substrate has an optical axis that is angularly deviated in a direction substantially opposite the direction of tilt toward the face, at a sufficient angle away from parallel with a line of sight to substantially minimize prismatic distortion.

10. The eyewear of claim 1, further comprising a level selector configured to adjust a level of visual difficulty provided by the first lens.

11. The eyewear of claim 10, wherein the level of difficulty is associated with the adjustable duration during which the first plurality of zones are substantially light blocking.

12. The eyewear of claim 1, further comprising a zone selector configured to select a predetermined set of the first plurality of zones for reduced optical transmission.

13. The eyewear of claim 1, further comprising:
the lens driver is configured to actuate a first set of zones of the first
plurality of zones and a second set of zones of the first plurality of zones to substantially transmit and substantially attenuate a light flux directed through the first lens;
a pattern selector configured to select the first set of zones and the second set of zones; and
a level selector for selection of the adjustable duration during which the first set of zones and the second set of zones are substantially attenuating.

14. The eyewear of claim 13, wherein the first set of zones and the second set of zones are arranged in rows and columns, and the pattern selector includes a row selector and a column selector configured to select one or more rows and/or one or more columns of zones to be in included in the first set of zones and the second set of zones.

15. The eyewear of claim 13, further comprising a display element secured to the eyewear and configured to indicate a level of visual difficulty presented by the eyewear.

16. A vision training system, comprising:
eyewear having a first lens and a second lens, wherein the first lens and the second lens have electrically variable spectral transmittance to selectively obscure a portion of a trainee's field of view;
a pattern generator configured to select and temporally vary the obscured portion of the trainee's field of view according to a duty cycle, wherein the duty cycle is comprised of an obscured state having a variable duration and an unobscured state having a fixed duration, the duty cycle operating at a frequency of 15 Hz or less; and
wherein a first pattern layer and a second pattern layer of the first lens are situated to produce a moiré pattern based on a superposition of patterns defined in the first and second pattern layers to selectively obscure the portion of the trainee's field of vision.

17. The system of claim 16, further comprising a memory configured to record the obscured portions of the field of view selected by the pattern generator.

18. The system of claim 16, further comprising a memory configured to store a sequence of field obscuration patterns to which the trainee is to be exposed.

19. The system of claim 16, wherein the pattern generator is configured to select the portion of the trainee's field of view based on an activity specific line of sight.

20. The system of claim 16, wherein the obscured portion of the field of view is a central portion of the field of view.

21. The system of claim 16, wherein the obscured portion of the field of view is a peripheral portion of the field of view.

22. Vision training eyewear, comprising:
a first lens defining a first plurality of zones having electrically variable spectral transmittance that create an obstruction pattern, wherein the electrically variable spectral transmittance is controlled by a lens driver;
the first lens includes a first pattern layer and a second pattern layer, wherein the first and second pattern layers are situated to produce an moiré pattern based on a superposition of patterns defined in the first and second pattern layers;
the first lens comprised of a lens substrate having an anterior surface and a posterior surface in an as worn position, wherein the anterior surface and the posterior surface have curvatures of at least 4 diopters;
a second lens defining a second plurality of zones having electrically variable spectral transmittance, wherein the lens drive controls the second plurality of zones independently of the first plurality of zones;
the second lens comprised of a lens substrate having an anterior surface and a posterior surface in an as worn position, wherein the anterior surface and the posterior surface have curvatures of at least about 4 diopters;
a frame configured to retain the first lens and the second lens; and
the lens driver controls the variable spectral transmittance of the first lens to cycle at a frequency less than 15Hz from a first spectral transmittance of a fixed duration of 0.1 seconds and a second spectral transmittance of an adjustable duration selected from one of the following 0.025, 0.043, 0.067, 0.1, 0.15, 0.233, 0.4, and, 0.9 seconds.

* * * * *